United States Patent [19]

Biritz

[11] Patent Number: 4,759,181
[45] Date of Patent: Jul. 26, 1988

[54] MANIFOLD, APPARATUS AND SYSTEM FOR EXHAUST TRANSFER AND COOLING OF V-TYPE MARINE ENGINES

[76] Inventor: Ronald A. Biritz, 2217 Tamarind St., Edgewater, Fla. 32052

[21] Appl. No.: 9,687

[22] Filed: Feb. 2, 1987

[51] Int. Cl.⁴ .................................................. F01N 3/04
[52] U.S. Cl. ...................................... 60/321; 123/41.08
[58] Field of Search ............... 60/321, 320; 123/41.08; 440/89

[56] References Cited

U.S. PATENT DOCUMENTS

| | | | |
|---|---|---|---|
| 2,060,187 | 11/1936 | Fernstrum | 123/178 |
| 2,382,218 | 8/1945 | Fernstrum | 115/0.5 |
| 2,682,852 | 7/1954 | Ruffolo | 115/0.5 |
| 2,757,650 | 8/1956 | Holley | 123/41.08 |
| 3,169,365 | 2/1965 | Benjamen | 60/31 |
| 3,185,123 | 5/1965 | Schiffer | 115/0.5 |
| 3,206,836 | 9/1965 | Schlussler | 29/157 |
| 3,242,914 | 3/1966 | Benger | 123/41.10 |
| 3,324,533 | 6/1967 | Watteau | 29/156.4 |
| 3,485,040 | 12/1969 | Niskanen | 60/30 |
| 3,696,620 | 10/1972 | Pace | 60/321 |
| 3,734,170 | 5/1973 | Pace | 165/51 |
| 3,780,712 | 12/1973 | Pace | 123/41.08 |
| 3,880,081 | 6/1975 | Fitts | 60/321 |
| 3,921,398 | 11/1975 | Kashmerick | 60/310 |
| 4,133,284 | 1/1979 | Holcroft | 115/75 |
| 4,187,678 | 2/1980 | Herenius | 60/321 |
| 4,214,443 | 7/1980 | Herenius | 60/321 |

*Primary Examiner*—Douglas Hart
*Attorney, Agent, or Firm*—Cedric M. Richeson

[57] ABSTRACT

A manifold and cooling system for V-type marine engines utilizing two novel exhaust manifold/cooling jacket units, each unit having separate cavities and a flow-through heat exchanger whereby engine coolant circulates through the engine block pumped by a water pump first into a forward cavity of one unit in fluidic communication with an exhaust manifold channel wall then traveling adjacent to the heat exchanger into a rearward cavity and into fluidic communication with a second portion of an exhaust manifold channel wall and then out of the unit via piping to a second unit into a rear cavity with similar fluidic communication with a second exhaust manifold channel wall then along a heat exchanger into a forward cavity and further channel wall contact, out of this unit and back into a engine block to complete the coolant circuit. Raw water is pumped (segregated from the coolant) through each heat exchanger and expelled back to the sea.

16 Claims, 3 Drawing Sheets

MANIFOLD, APPARATUS AND SYSTEM FOR EXHAUST TRANSFER AND COOLING OF V-TYPE MARINE ENGINES

BACKGROUND OF THE INVENTION

The invention relates to exhaust manifolds and cooling systems for internal combustion engines and more particularly to those manifolds and systems adapted for use with marine engines.

Internal combustion engines have long been employed as powerful inboard motors for propelling boats especially in salt water environs. Both in-line and V-type marine engines are utilized extensively with automobile and truck engines being commonly adapted for marine purposes. However, adaptation of internal combustion engines, originally designed for land propulsion, to use in a marine environment poses several problems which necessitate significant modifications. One of the more important modifications in transforming an automobile or truck engine into a marine engine (or in building a dedicated marine engine) is made to ensure adequate engine cooling. In a typical water-cooled automotive engine, heat is removed from the engine by transfer to fresh water or coolant which is then in turn cooled by air blowing through the vanes of a radiator. However, this cooling system is inappropriate for marine engines which are often located in an enclosed area away from adequate air flow. U.S. Pat. Nos. 2,060,187 (Fernstrum) and 4,133,284 (Holcroft) describe a commonly employed method of marine engine cooling which transfers some of the water surrounding a boat through the cooling system with subsequent expulsion of the heated water back into the river, bay or surrounding body of water. This method known as the "raw water system" has proved to be extremely corrosive to marine engines being used in salt water. Also, sea water tends to precipitate salt out of solution at temperatures which are below the optimum for operating marine engines. Salt has been found to precipitate out at temperature in excess of about 140°–150° F. This salt precipitate obstructs cooling passageways by caking, contributes to destructive corrosion and forms an insulating scale which acts to reduce heat transfer efficiency. Recognition of the aforementioned problems has caused the development of marine cooling systems in the prior art which has known as "fresh water systems" in which raw water is passed through a heat exchanger rather than the engine block and then expelled. In the heat exchanger the raw water absorbs heat from a separate stream of recirculating coolant without commingling. Therefore, coolant or fresh water is recirculated through the engine block and cooled by heat transfer through a raw water fed heat exchanger. In the fresh water system, the fresh water circuit may be pressurized with thermostat control to optimize engine operating temperatures. In most prior raw water and fresh water systems, raw water is passed through a jacket surrounding the exhaust manifold before expulsion to the sea or surrounding body of water. The great hazard of boat fires place an increased emphasis on maintaining safe exhaust manifold temperatures. One type of fresh water system is described in U.S. Pat. No. 4,187,678 (Herenius).

These above commonly employed cooling systems for marine engines generally utilize many separate components which require extensive plumbing thereby making prior art systems expensive, cumbersome and complicated to maintain and repair. Corrosion continues to be a problem which necessitates costly and time consuming repair, cleaning or replacement of multiple component systems. Typical prior art systems use plumbing having one or more of the following disadvantages: (1) too many conduits (more expensive, cumbersome, labor intensive installation and/or replacement); (2) use of conduits having a small diameter (increased susceptability to obstruction); (3) conduits are too long (more expensive, increased surface area for conduit failure e.g. by corrosion or chemical degradation, obstruction of access to other engine components thereby increasing labor for maintenance and upkeep); and/or (4) galvanic corrosion by having dissimilar metals connected by an electrolytic solution (e.g. salt water).

An inexpensive, low maintenance, easy to install, long lasting system and apparatus which ameliorates many of the aforementioned problems has been discovered and forms the present invention as described below.

SUMMARY OF THE INVENTION

The present invention provides an exhaust transfer and cooling apparatus having an exhaust manifold with connected cooling jacket and means for connecting the apparatus to an engine block. The exhaust manifold has a channel wall forming a main exhaust channel connecting a plurality of engine exhaust transfer channels to a manifold exhaust gas port. The cooling jacket has integrally connected top, bottom, front, rear and side walls forming an interior space which is divided into at least one front cavity and at least one rear cavity by a partition. Advantageously, this partition is integrally connected to the cooling jacket and has access means such as an opening for communicating heat exchange means (such as a heat exchanger tube bundle with casing) between the front and rear cavities. The cooling jacket also has (a) a first access means, such as an opening, for providing fluidic communication between the front cavity and the cooling jacket exterior, (b) a second access means (such as an opening) for fluidic communication between the rear cavity and the cooling jacket exterior, (c) means for supporting a heat exchanger apparatus within the cooling jacket, and (d) duct means for fluidic communication between the jacket exterior and either or both forward and rearward cavities whereby a heat exchanger apparatus may be located within the cooling jacket yet connected for fluidic communication to the cooling jacket exterior.

The novel exhaust transfer and cooling apparatus may advantageously be utilized in a novel process for cooling a V-type internal combustion engine. This novel process circulates by pumping means a coolant fluid through at least one passageway in an engine block and/or cylinder heads thereby absorbing heat, and conveys the coolant into a first cooling jacket for a first exhaust manifold via a first transfer means such as pipe or hoses. The first cooling jacket contains a first heat exchanger apparatus through which raw water is pumped. The raw water has a lower temperature than the coolant and is segregated from the circulating coolant by a physical barrier of the first heat exchanger apparatus. This barrier separates the raw water from the coolant while facilitating heat transfer between the coolant and raw water. Coolant absorbs heat from the exhaust manifold and desorbs heat to the raw water and is passed by second transfer means out of the first cooling jacket and into a second cooling jacket for a second exhaust manifold. The second cooling jacket contains a second heat exchanger apparatus through which raw water is pumped. This raw water also has a lower temperature than the coolant and is segregated from the circulating coolant by a physical barrier of the second heat exchanger apparatus. This barrier promotes heat transfer through the barrier between the coolant and the raw water yet prevents any commingling of coolant and raw water. The coolant again absorb heat from an exhaust manifold and desorbs heat to the raw water and is then transferred, by third transfer means, out of the second cooling jacket and into the engine block/cylinder head passageways to absorb more heat thereby completing circulation of the coolant within a closed circuit.

Advantageously, the above novel process will utilize an inventive heat exchanger apparatus having an elongate tube casing with proximate and distal ends connected by a cylindrical side wall. The side wall has a plurality of openings near each opposing end and encloses a plurality of spaced apart heat exchanger tubes. These tubes have opposing ends which are open so that each tube provides an elongate channel with an opening extending through the proximate end and on opposite opening extending through the distal end of the tube casing for fluidic communication therethrough.

Advantageously, the inventive heat exchanger and/or manifold may be provided in kit form with the necessary plumbing accessories to convert a V-type automobile or truck engine to marine use utilizing the novel cooling process. A heat exchanger apparatus kit may be used as a replacement kit or adapted for use with other systems or manifolds. Generally the heat exchanger kit will have in addition to the heat exchanger a pair of 3-way insulating reducer boots and a plurality of clamps and/or hoses. A manifold unit kit may beneficially have everything included in the heat exchanger kit plus a pair of exhaust transfer and cooling unit manifolds.

DETAILED DESCRIPTION OF THE INVENTION

Figures 1, 2, 3, 4, 5:
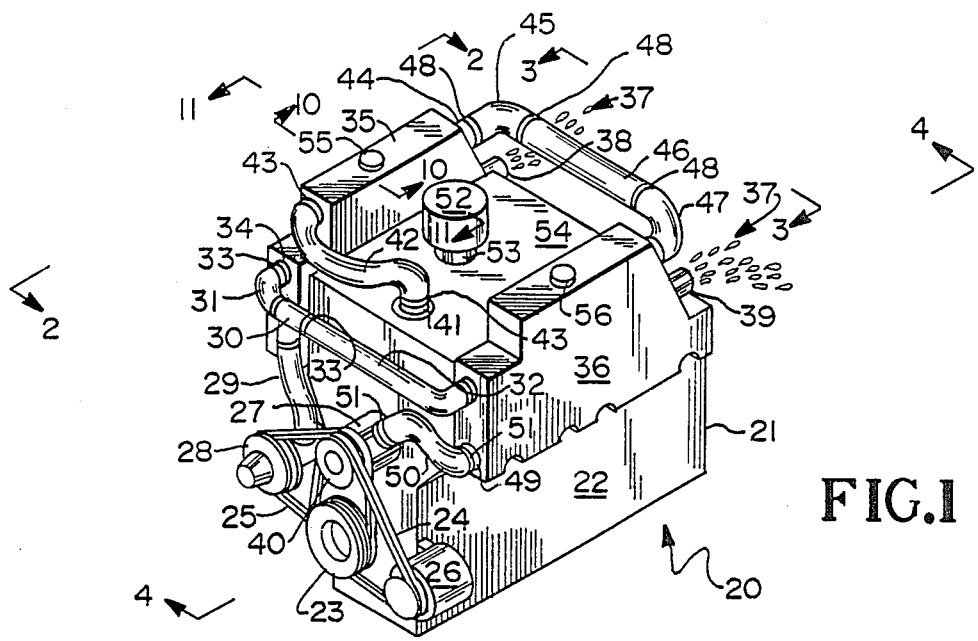
FIG. 1 depicts an isometric schematic view of a typical embodiment of the invention showing a V-type internal combustion engine equipped with the inventive exhaust transfer and cooling manifold unit forming an inventive cooling system.
FIG. 2 is a side view of FIG. 1 taken along lines 2—2 which clearly depicts an outwardly disposed surface of an attached manifold unit.
FIG. 3 is a rear view of FIG. 1 taken along lines 3—3 which depicts a rear fluid transfer connection between opposing manifold units.
FIG. 4 is a side view of FIG. 1 taken along lines 4—4 depicting connection and attachment of a manifold unit.
FIG. 5 is a side view of a manifold unit taken along lines 5—5 of FIG. 3; for clarity connected hoses are not depicted.

Referring now to FIG. 1, an isometric schematic view depicts a system or process 20 and apparatus for exhaust transfer and cooling of a V-type engine in general and marine engines in particular. A typical V-type engine 21 such as a 350 cubic inch automobile engine manufactured by the Chevrolet Division of General Motors is shown adapted for marine use utilizing commonly employed and known electrical, fuel, lubricating, ignition, control and transmission systems. An engine block 22 supports a pulley 23 connected to and powered by an engine crankshaft (not shown) during engine operation. The pulley 23 transmits rotary motive force via belts 24 and 25 to an alternator 26, coolant pump 27 and raw water pump 28.

Raw water is defined as water or coolant which comes from a source external to the engine 21 or its parts. Typically, raw water will be water in which a boat containing the engine 21 is floating. Raw water may be salt or fresh water and come from any surrounding body of water such as an ocean, sea, bay, river, lake, etc. Raw water pump 28 pumps raw water through a conduit (not shown) having an opening in a raw water source such as sea water. Usually additional known devices such as a strainer, a cleanout pipe, valve or seacock, etc. are employed e.g. to scoop up raw water, or remove debris before transfer to the raw water pump 28. A device such as a cleanout valve may be employed for maintenance. Raw water is pumped into one or more heat exchangers (See FIGS. 8 and 9) via conduit means such as a synthetic rubber tube 29. The raw water is separated into individual streams for each heat exchanger, for example, by stream divider means such as T-connector 30 and tubes 31 and 32. All tubes may be connected using standard commonly available hose clamps 33. Each tube 31 and 32 is connected to its respective heat exchanger (See FIG. 8A) by a standard rubber-type reducer 34. For example, an isolation boot for reducing a 2¾" pipe to a 2" pipe to a ¾" pipe may be used to connect tube 31 to a heat exchanger and cooling jacket pipe. Raw water is pumped from tubes 31 and 32 through individual heat exchangers located in respective exhaust transfer and cooling units 35 and 36 and raw water spray 37 expelled out of the heat exchangers through respective rear collars 38 and 39. Preferably collars 38 and 39 will also comprise the reducers described above. In one embodiment of the invention raw water spray 37 is contained within respective conduit means (not shown) and transferred to ducts (not shown) for combination with exhaust gases. The combined spray 37 and exhaust gases may then be routed and removed according to kown apparatus and methods for release into the environs. The combination of spray 37 with exhaust gases may occur before, after or in between additional spray or gas processing steps by devices such as pollution control equipment or mufflers, etc. Release may be made according to known methods either below a water surface or to the atmosphere.

The present invention utilizes a closed circuit, recirculating cooling system containing a coolant which may be fresh water, anti-freeze or mixtures thereof with or without additive. The coolant employed will be any coolant commonly used in automotive or marine internal combustion engines. The coolant pump 27 generally comprises a common water pump (for the 350 c.i. Chevrolet engine the original automotive water pump is suitable) not requiring any modification other than perhaps a different coolant pump pulley 40 to accommodate the necessary belts and achieve optimum pumping flow. The coolant pump 27 forces coolant through internal passages (not shown) in the engine cylinder block 22 designed to remove heat from the block around the cylinders and valves by heat transfer to the coolant. The coolant is then pumped from the block 22 via a coolant outlet 41 through a hose 42 into a left exhaust transfer and cooling unit 35 via a first access means such as a flanged inlet pipe (see FIG. 8A). Suitable hoses such as hose 42 are commercially available. For example, reinforced synthetic rubber hoses commonly used for automotive and marine cooling systems may be employed. These hoses generally will have a diameter sufficient to facilitate coolant transfer e.g. from the block 22 to unit 35. Diameters of from about $1\frac{1}{8}$ inch to about $1\frac{1}{4}$ inch may be suitably employed. The hose 42 is removably secured to a prefereably flanged inlet pipe (see FIG. 6A) of block 22 and unit 35 by removable hose clamps 43. Coolant circulation within units 35 and 36 is designed to absorb heat from exhaust manifold portions located within said respective units 35 and 36 and also to transfer this absorbed heat (and heat absorbed from passage through the engine block) through unit-contained heat exchangers to continuously flowing raw water. This raw water is then expelled as described in more detail below. After completing a circuitous path within unit 35, the coolant is transferred out via a second access means such as flanged outlet pipe 44 and conveyed by connected transfer means such as a left elbow tube 45, rear hose 46, and right elbow tube 47 to a second access means, e.g. a flanged pipe inlet, (see FIG. 7A) of an exhaust transfer and cooling unit 36. All connections are made by securing means such as hose clamps 48. Coolant then enters the rear of unit 36, follows a circuitous path therein, and exits via a first access means such as an outlet pipe 49 to conduit means such as coolant pump hose 50 which conveys the coolant to an inlet opening on coolant pump 27. The hose 50 is removably secured to unit 36 and pump 27 by removable hose clamps 51. The coolant enters pump 27 and is pumped back into block 22 to complete a continuous coolant circuit.

For purposes of illustration, an air cleaner 52 is depicted attached to a carburetor 53 which is connected to intake manifold 54 which in turn is connected to block 22 in known fashion serving well known functions in V-type internal combustion engines. The coolant is initially added to system 20 by openings in units 35 and 36 via removable caps 55 and 56. These capped openings also allow replacement of coolant or addition of additives such as rust inhibitors, water pump lubricants, etc.

The above described system 20 provides a closed-path recirculating coolant system having means and apparatus for pumping raw water out of a surrounding body of water and through heat exchangers located within each exhaust transfer and cooling unit. Advantageously, the present inventive system utilizes and adapts common automobile and/or truck engines with a minimum of modification to provide a novel engine cooling and exhaust system which is particularly suitable for marine use. In system 20, no engine fan or radiator is required, instead a raw water pump 28 is bolted or otherwise secured to an engine block so that it may be operated by belt from a rotating crankshaft. The crankshaft pulley 23 and coolant pump pulley 40 may be replaced e.g. by pulleys of differing diameters to provide optimum pumping and therefore cooling. In the depicted system a commercially available raw water pump having a 36 gallon per minute output at 3000 r.p.m's such as an Oberdorfer 402M-3 raw water pump may be utilized with an 8 inch diameter crankshaft pulley and 6 inch diameter coolant pump pulley to provide adequate raw water and coolant output. Of course, in view of the present disclosure it will be well within the skill of an ordinary mechanic to select appropriate pumps and pulleys without undue experimentation. The coolant pump 27 may be an automotive factory installed unit used without further modification. Inventive opposing exhaust transfer and cooling manifold units 35 and 36 will replace the originally designed or installed exhaust manifolds. The coolant is routed using commonly available hoses, clamps and connectors. The system minimizes plumbing and eliminates external heat exchangers and expansion tanks while allowing the internally located heat exchangers to be removed for maintenance and replaced or repaired without necessitating removal of the manifold-containing units 35 and 36 from the engine. Each unit 35 and 36 for the depicted Chevy engine has a coolant capacity of about $1\frac{5}{8}$ gallons. The two units 35 and 36 combined have a capacity of about $3\frac{1}{4}$ gallons. Total system capacity will be greater due to coolant capacity within the engine block passages, hoses and pump. Of course, systems having lesser or greater capacity may be easily constructed by one of ordinary skill in the art by decreasing or increasing unit size. It is expected that it may be necessary or desirable to alter, decrease or increase unit shape and/or capacity to adapt exhaust transfer and cooling units to different engines. Of course, V-type engines such as V-4, V-6 and V-8 gasoline and diesel engines will have varying design requirements from one another, however, such changes and modifications are believed to be obvious in view of the present disclosure and that which follows to one of ordinary skill in this art. It should be apparent that the invention may be adapted for use with any type engine having opposing manifolds and use on engines of more than eight cylinders is contemplated.

In one beneficial embodiment unit caps 55 and 56 may advantagesouly comprise radiator caps such as valved 14 lb. pressure cap and may be used with a tube to connected a unit filler opening to a surge tank to accommodate thermal expansion and contraction of coolant without suffering coolant loss. Also the interior of units 35 and 36 may contain a space which acts as an expansion tank. The above described system may be set to achieve a optimum running temperature of about 180° F. or more without destructive corrosion of or precipitation within the engine block or exhaust transfer and cooling unit due to contact with raw water because raw water contacts only the heat exchanger apparatus. Advantageously, should corrosion of the heat exchanger cause holes through the heat exchanger tubing or casing, engine coolant levels should not drop and cause engine failure since the heat exchanger is enclosed within an exhaust transfer and cooling unit. Such enclosure by the present invention also reduces the possibility of accidental puncture or damage as may occur with externally located heat exchangers.

Referring to FIG. 2, a side view of system 20 taken along lines 2—2 of FIG. 1 is depicted with a typical V-type engine 21 having engine block 22 and connected oil pan 57. An exhaust transfer and cooling unit 35 has a planar outer wall 58. The unit 35 is attached to the block 22 by fastening means such as bolts 59 which extend through holes (See FIG. 8A) located through an integral support member of the unit 35. The outer wall 58 may be formed with sunken depressions 60 so that the bolts 59 may have terminating heads which are either recessed or flush with wall 58. The exhaust transfer and cooling unit 35 has a perimeter formed by a bottom edge 61 which extends to a front edge 62 then to a L-shaped recess 63, a top edge 64, a sloped rear edge 65, an exhaust extension edge 66 and back to the bottom edge 61. The coolant may be added to the unit 35 via an access plug or radiator type cap 55 located atop unit 35.

In operation a crankshaft 68 rotates a double pulley 23 thereby turning an outer pulley belt 24 and an inner belt 25. The inner belt 25 rotates a pulley 69 attached to a raw water pump 28 thereby driving the pump 28 to move raw water by transfer means (not shown) through a raw water inlet hose 70 and pump 28, and out through a tube 29 into plumbing means for distribution to individual heat exchangers (See FIG. 1). A portion of the raw water is pumped via connecting tube 31 into a heat exchanger located within the exhaust transfer and cooling unit 35 (See FIG. 8A)0. The raw water passes through the heat exchanger and is expelled out through an insulating collar 38 which is attached to an outlet pipe of the unit 35. The collar 38 may be a 3-way rubber-type reduced which allows clamping of the reducer to (a) a unit outlet pipe, (b) a heat exchanger and (c) any additional plumbing such as a rubber-type hose designed to conveniently carry away the expelled raw water. Both the inner belt 25 and outer belt 24 are connected to a double pulley 40 of a coolant pump 27 which when driven by the belts 24 and 25 will pump recirculating coolant through the engine block 22 and hose 42 to transfer coolant into the unit 35. The coolant under pressure exits the unit 35 through a rear opening into an elbow hose 45.

Figure 11:
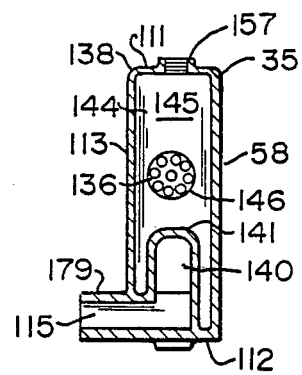
FIG. 11 is a cross-sectional view of a manifold unit of FIG. 1 taken along lines 11—11 with a top cap removed for clarity.

Referring now to FIG. 3, the engine 21 transmits motive force through a flywheel 71 in the engine block 22 by known means and apparatus to connected equipment for propulsion such as a propeller for a boat. Circulating coolant is pumped through a unit 35 via an elbow hose 45 through a rear transverse hose 46 into another elbow hose 47. The elbow hose 47 transfers the coolant a second exhaust transfer and cooling unit 36. All hose connections may be made using commonly employed fastening means such a hose clamps 48. Each unit 35 and 36 contains an individual exhaust manifold portion preferably formed integrally with the unit. First unit 35 receives exhaust gases through openings in side extensions such as a side extension 72 of unit 35. Exhaust gases from each engine cylinder is tranferred to a corresponding port and extension. Adjacent ports are sometimes combined into a single side extension. As best shown in FIGS. 8A, and 11 exhaust gases from individual ports travel through channels in extensions similar to side extension 72 and into, through and out a main exhaust channel which opens out of first unit 35 through a manifold exhaust gas port 73. The opposing second unit 36 has a corresponding side extension 74 through which exhaust from engine cylidners (adjacent to unit 36) passes into a main channel and out a manifold exhaust gas port 75. A pair of rear extensions 76 and 77 assist in conducting exhaust away from the respective units 35 and 36. Fastening means such as threaded holes 78 allow attachment of transfer means such as an exhaust pipe to convey exhaust away from the engine 21. The units 35 and 36 have respective rear walls 79 and 80 through which respective streams of raw water may be expelled from heat exchangers via openings having respective collars 38 and 39. Collars 38 and 39 will typically comprise rubber reducers having a large diameter portion 81 reducing to a medium diameter portion 82 which reduces to a small diameter portion 83 thereby facilitating connection of (a) a unit outlet pipe, (b) a heat exchanger and (c) a conveniently sized hose, using a single connection collar. Each unit 35 and 36 is equipped with a cap 55 and 56, respectively, for adding coolant.

Referring now to FIG. 4, which depicts a side view of system 20 of FIG. 1 taken along lines 4—4, coolant (as described above) circulates from an elbow hose 47 into an exhaust transfer and cooling unit 36 via a flanged inlet pipe in a rear wall 80 of unit 36. Unit 36 is supported preferably by attachment to an engine block 22 by fasteners such as bolts 59 located in sunken depression 84 adjacent a lower edge 85 of unit 36. Unit 36 has a generally planar outer wall 86 bounded by a peripheral edge formed by lower edge 85 which turns upward into front edge 87 then forms a reverse L-shaped recess 88 and continues along top edge 89 to downwardly sloping rear edge 90. Rear edge 90 turns outward to form exhaust extension edge 91 and then drops down along exhaust rear edge 92 to lower edge 85 to complete a continuous perimeter edge. Rear edge 90 also connects rear surface 80 with planar outer wall 86. A coolant filler cap 56 is provided to allow addition of coolant to an interior cavity of unit 36.

Figure 9:
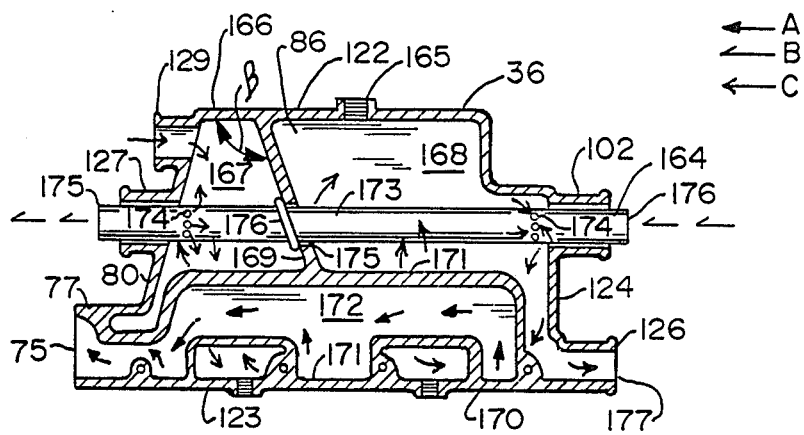
FIG. 9 is a sectional view of the manifold unit of FIG. 6B taken along lines 9—9.

Circulating coolant which enters the unit 36 via a hose 47 follows a circuitous internal route which causes the coolant to both absorb heat from an interiorly located exhaust manifold portion of unit 36 and desorb heat to raw water supplied to an interiorly disposed heat exchanger via a hose 32 (see FIG. 9). The heated raw water is then carried away from the exhaust transfer and cooling unit 36 by an outlet pipe having a collar 39. The coolant upon completion of a circuitous route within the unit 36 then exits through an outlet pipe to a coolant pump 27 via a hose 50. The coolant pump 27 is driven by a crankshaft of the engine 21 via belts 24 and 25 which connect a coolant pump pulley 40 to a crankshaft pulley 23. The coolant pump 27 circulates coolant back into passages in the engine block 22 to provide cooling to the block 22 and its components. Raw water is supplied to a raw water pump 28 via a raw water inlet hose 70. The raw water pump 28 is driven by the engine crankshaft through pulleys 23 and 69 connected by inner belt 25. The water pump 28 sends raw water via transfer means such as hoses into and through a distribution tube 32 into exhaust transfer and cooling unit located heat exchangers. The outer belt 24 is also connected to a pulley 93 which drives an alternator 26.

Referring now to FIG. 5, an exhaust transfer and cooling unit 36 is shown. This view is taken along 5—5 of FIG. 3, however, for clarity the unit 36 is shown without any attached hoses, caps, clamps, etc. A plurality of side extensions 74, 94, and 95 are shown adjacent to a lower edge 96 of the unit 36. Each side extension 74, 94, 95 has at least one engine exhaust transfer channel 97 adapted to receive exhaust gases expelled from an engine block cylinder. Middle side extension 94 contains two individual transfer channels 97 for two corresponding and adjacent engine cylinder exhaust ports. The extensions 74, 94 and 95 act to space unit 36 a suitable distance away from the engine block thereby allowing greater flexibility in spacing and arrangement other engine components, greater access to the engine, increased ability to adapt one unit for use on multiple engine designs, etc. In a preferred embodiment, adjacent channels 97 such as those depicted in side extension 94 are utilized, however, it will be obvious one of ordinary skill that a single larger transfer channel may be used instead of the two individual channels by formation of the channel without separating wall 98. Unit 36 may be attached to an engine block or other supporting structure by fastening means such as threaded holes 99 located through integral support members 100. A support member 100 may be formed of an additional thickness of metal or supporting material which is sufficient to resist cracking or breaking e.g. around a threaded hole. The individual exhaust transfer channels 97 are connected together by a main exhaust channel (see FIG. 9) to transfer exhaust gases away through an opening in a rear surface of rear exhaust extension 77.

Each exhaust transfer and cooling unit such as the second unit 36 has duct means such as a front inlet pipe 102 having a rim 103 and a rear outlet pipe 104 with rim 105. Rims 103 and 105 assist in securing collars, tubing, connectors or transfers means to the respective pipes. The duct means such as pipes 103 and 104 are adapted to receive a heat exchanger unit therethrough for location within unit 36.

Each unit also has a first access means such as a pipe 106 with a securing rim 107 which provides means for fluidic communication between the exterior of the unit and a forward cavity located therein (see FIG. 9). A second access means such as pipe 108 with securing rim 109 provides fluidic communication between a rearward interior cavity of the unit and the unit exterior. An inner wall 110 rises from lower edge 96 and corresponds in shape to parallely attached and spaced apart outer wall 86 of FIG. 64 to define with connecting walls on interior space as described below in further detail.

Figure 6A:
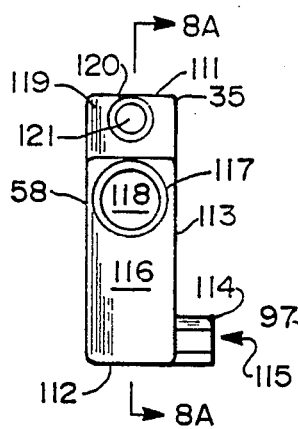
FIG. 6A is a front view of an unattached manifold unit with a cut away portion through a forward exhaust duct.

Referring now to FIG. 6A, a front view is presented of an unattached exhaust transfer and cooling manifold unit such as unit 35 of FIG. 1. Unit 35 has a top wall 111, outer wall 58, bottom wall 112, and inner wall 113 forming a perimeter with a plurality of connected extensions such as a front side exhaust extension 114 projecting outwardly from the inner wall 113. Extension 114 has an engine exhaust transfer channel 115 for admission of exhaust from an engine cylinder exhaust port (not shown). A main front surface 116 of unit 35 contains duct means such as flanged front heat exchanger inlet pipe 117 having an opening 118 which typically extends straight through unit 35 to accommodate a heat exchanger as described in FIG. 8B. Front surface 116 has a recessed portion 119 which contains a first access means such as flanged coolant inlet pipe 120 for fluidic communication between an interior cavity of unit 35 and the unit exterior. The inlet pipe 120 has an opening 121 for passage of coolant into unit 35. Generally, the opening 118 of the front heat exchanger inlet pipe 117 will have a diameter sufficient to accommodate a heating exchanger unit such as that described below; an interior diameter of about 2¼ inches is suitable for such a heat exchanger unit having about 50 tubes. The recessed front surface 119 facilitates attachment of plumbing hoses to both pipes 117 and 120.

Referring now to 6B, a front view is presented of an unattached exhaust transfer cooling manifold unit such as unit 36 of FIG. 1. Unit 36 has a top surface 122, outer surface 86, bottom surface 123, and inner surface 110 forming a perimeter with a plurality of extensions such as a front exhaust side extension 95 projecting out from inner surface 110. Extension 95 has an engine exhaust transfer channel 97 for receiving exhaust gases expelled from an engine cylinder exhaust port. Duct means such as a flanged front inlet pipe 102 connected to a front surface 124 generally will have an opening 125 sufficient for placement of a heat exchanger within unit 36. The opening 125 generally will extend through unit 36 in a linear fashion. A recessed portion 124a of front surface 124 maintains a configuration of unit 36 having an approximately equal fluid capacity as unit 35. A flanged coolant outlet pipe 126 provides first access means for fluidic communication between an interior cavity of unit 36 and the unit exterior.

Figure 6B:
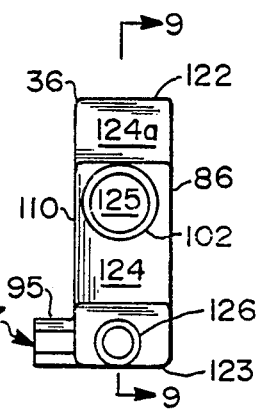
FIG. 6B is a front view of an unattached opposing manifold unit with a cut away portion through a forward exhaust duct.
Figure 7A:
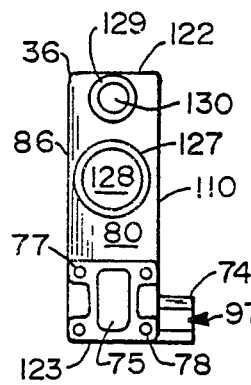
FIG. 7A is a rear view of the manifold unit of FIG. 6B.

Referring now to FIG. 7A, a rear view of the exhaust transfer and cooling manifold unit of FIG. 6B is shown. Unit 36 has a perimeter formed by a top surface 122, an outer surface 86, a bottom surface 123, and an inner surface 110 with a plurality of side extensions such as extension 74 projecting from the inner surface 110. Extension 74 has an exhaust transfer channel 97 which connects with an interiorly located main exhaust channel (see FIG. 8A) to transfer exhaust gases through the rear extension 77 and out a rear extension manifold exhaust port 75. Fastening means such as threaded holes 78 allow attachment of additional devices such as an exhaust pipe (not shown) to the manifold unit 36. Rear surface 80 has duct means such as a flanged rear outlet pipe 127 having an opening 128 with a diameter sufficient to receive a heat exchanger therethrough as described above with respect to unit 35. Rear surface 80 also has a second access means for fluidic communication between an interior cavity of unit 36 and the unit exterior. This second acess means may comprise a flanged inlet pipe 129 having an opening 130 of sufficient diameter to receive adequate flow of coolant during pumping. For a 350 cubic inch V-8 Chevrolet engine such as that manufactured by the Chevrolet division of General Motors, an inner diameter of about 1¼ inches is suitable for single hole, circular inlet and outlet pipes for both first and second access means for both units 35 and 36.

Figure 7B:
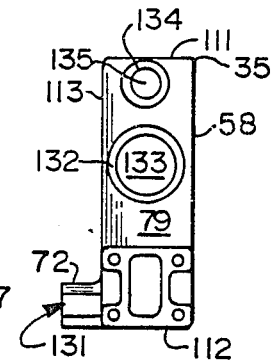
FIG. 7B is a rear view of the manifold unit of FIG. 6A.

Referring now to FIG. 7B, a rear view of the manifold unit 35 of FIG. 6A is shown with a rear surface 79 having a perimeter formed by a top surface 111. an outer surface 58, a bottom surface 112, and an inner surface 133. A plurality of side extensions such as rear exhaust side extension 72 having an exhaust transfer channel 131 project outwardly from an inner surface 113 to provide a spacing of most of unit 35 away from an attached engine after installation. Rear surface 79 has duct means such as an outlet pipe 132 having an opening 133 which extends through unit 35 to the opening 118 of FIG. 6A. This passageway connecting openings 118 and 133 allows installation and removal of a heat exchanger unit within unit 35. Unit 36 (see FIGS. 6B and 7A) is similarly adapted to accommodate heat exchanger. Rear surface 79 also has a second access means such as a flanged outlet pipe 134 for fluidic communication between an interior cavity of unit 35 and the exterior of the unit. The flanged outlet pipe 134 has an opening 135 for transfer of coolant out of a cavity within unit 35 through appropriate plumbing as described above to a second access means of unit 36 such as a coolant inlet pipe 129. Both units 35 and 36 may be made of metal by known casting processes. Suitable metals which may be employed include iron, aluminum and their alloys. Preferably, aluminum/magnesium alloys such as an alloy available under the name ALMAG 35 are utilized. Advantageously, construction of a unit combining both exhaust manifold with cooling jacket may be accomplished by molding or casting to form an integral unitary product. On an alternate embodiment one or more components or walls are securely connected together by welding, bolting, or other known fastening means to form an integral unit. Each unit 35 and 36 contains an exhaust manifold portion to collect and transfer exhaust gases away from the engine.

Referring now to FIG. 8A, a sectional view of unit 35 taken along lines 8A—8A of FIG. 6A is depicted with a heat exchanger 136. Unit 35 comprises an exhaust manifold 137 having a cooling jacket 138. Preferably, the exhaust manifold 137 and cooling jacket 138 are integrally formed e.g. by known casting processes. The manifold portion 137 is designed to receive during operation exhaust gases from adjacent engine cylinder ports through engine exhaust transfer channels 115. For a V-8 engine there would typically be four transfer channels per manifold 137 with two manifold and cooling jacket units (see FIG. 1) per engine. In another embodiment, exhaust from adjacent cylinder ports may be fed to a combined channel e.g. by forming the manifold 137 without a transfer channel separating wall 139. Exhaust gases are expelled under pressure from engine cylinders and forced through these individual engine exhaust transfer channels 115 into a main exhaust channel 140 formed by a continuous channel wall 141. These exhaust gases are then expelled through a manifold exhaust gas port 142. Exhaust gas flow is indicated in FIG. 8a by the arrows denoted A.

The cooling jacket portion 138 of unit 35 is formed by integrally connected top wall 111, rear wall 79, bottom wall 112, front wall 116, inner side wall 113, and outer side wall 58 (see FIG. 2). The interior space of cooling jacket 138 is divided into a front cavity 143 and a rear cavity 144 by an integrally connected partition or baffle 145. Partition 145 has an opening 146 which is adapted to receive therethrough heat exchange means such as apparatus 136. Therefore, the opening 146 of partition 145 provides for communicating heat exchanger means between the front cavity 143 and the rear cavity 144. The front wall 116 and rear wall 79 have duct means for fluidic communication between the heat exchanger 136 (which is substantially enclosed within the cooling jacket 138) and the jacket exterior. Fastening means such as threaded holes are provided for connection of the unit to an engine. An area surrounding the hole 147 may form a thickened member for structural support. An inlet pipe 117 and front wall 116 and an outlet pipe 132 and rear wall 79 act in conjunction with a collar such as 3-way reducer 38 and clamps 148, 149 as both means for supporting and securing the heat exchanger apparatus 136 within the cooling jacket 138 and also as duct means for directing fluid flow through a plurality of heat exchanger tubes 150. These tubes 150 are secured in parallel and spaced-apart relationship within heat exchanger casing 151. Both inlet and outlet pipes 117, 132 have flanges 152, 153, to facilitate a secure connection of a large diameter portion 81 of reducer 38 to inlet pipe 117. The connection of portion 81 to pipe 117 by clamp 148 should be sufficiently secured to prevent escape of coolant from a front cavity 143 into the exterior of unit 35. Another important connection is made by heat exchanger clamp 149 which secures a medium diameter portion 82 of reducer 38 to an end portion 154 of the heat exchanger 136. This connection may be secured by double clamping to ensure against leakage or commingling of raw water and coolant as described below.

The reducer 38 is a commercially available synthetic rubber plumbing fitting designed for connection of fixtures, hoses or pipes having three different diameters. The reducer 38 provides a continuous tubular wall which reduces from a large diameter portion 81 to a medium diameter portion 82 to a small diameter portion 83 and has sufficient flexibility to provide in conjunction with clamping means such as hose clamps 148 and 149 a barrier to leakage of liquid from one side of the clamped portion to the other opposing side.

Figure 8B:
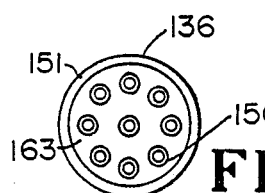
FIG. 8B is an end view of a heat exchanger.
Figure 8A:
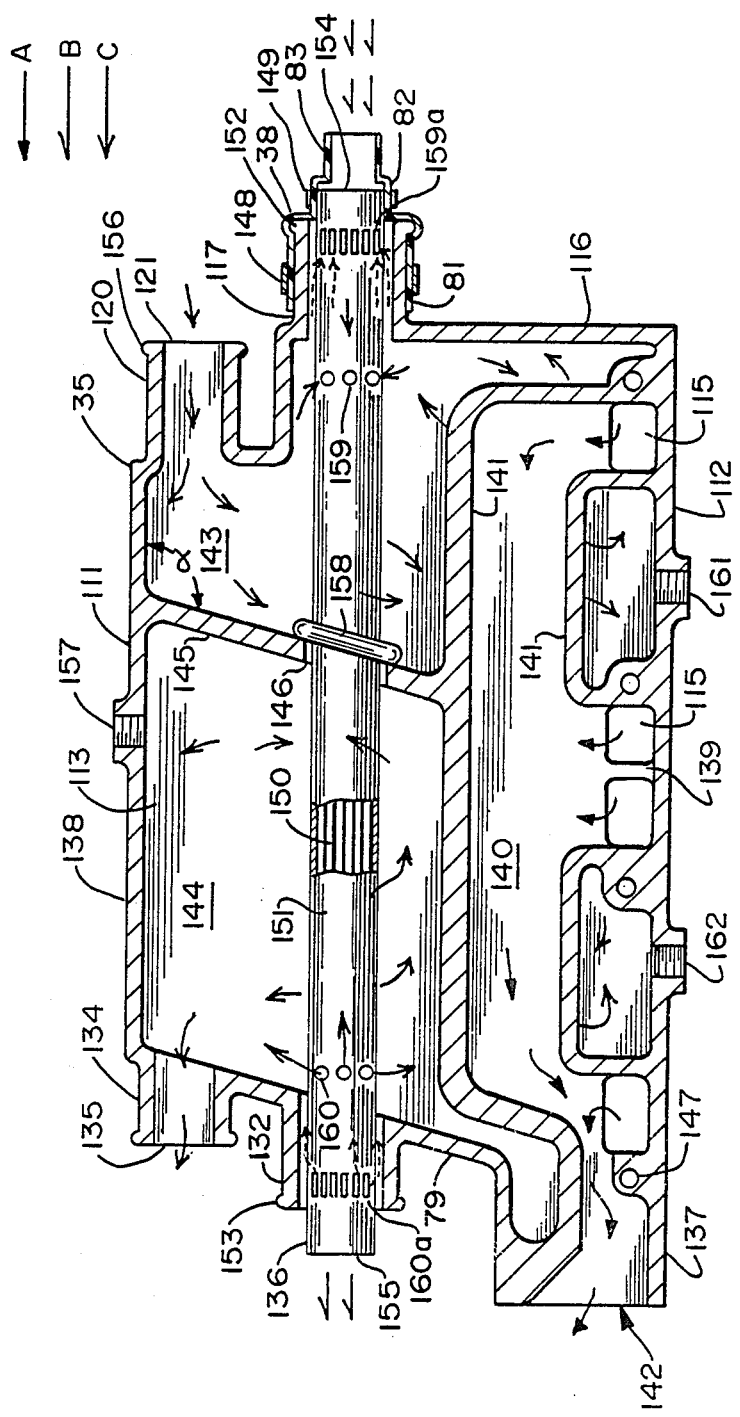
FIG. 8A is sectional view of the manifold unit of FIG. 6A taken along lines 8A—8A depicting an internally disposed heat exchanger.

The small diameter portion 83 may be secured by known means to conduit means such as a rubber hose to convey liquids such as raw water to and from openings in respective ends 154, 155 of the heat exchanger tube casing 151 (see FIG. 8B). A reducer and hose clamp as described above for duct means, supporting means, and/or securing means is suitably used for both front and rear walls of the heat transfer and cooling manifold unit. It should be clear that the above reducer/clamp arrangement is both suitable and preferred for both units 35 and 36.

In operation raw water will be pumped via a raw water pump (see FIG. 1) into a plurality of heat exchanger tubes 150 located within the heat exchanger tube casing 151 adjacent the heat exchanger end 154. The raw water will travel through the tubes 150 and be expelled out of an opening in opposing heat exchanger end portion 155 as illustrated by arrows designated as B in FIG. 8A.

The front wall 116 also provides a first access means for fluidic communication between the front cavity 143 and the cooling jacket exterior. The first access means comprise a coolant inlet pipe 120 having a flange 156 to aid in securing conduit means such as a hose. The coolant inlet pipe 120, as all pipes accessing the interior of the cooling jacket 138, is preferably of circular cross-section and has an opening 121 to receive coolant which is pumped into the front cavity 143. The coolant may be any suitable coolant commonly used in internal combusion engines such as fresh water, ethylene glycol, or mixtures thereof. The coolant follows a circuitous path within the cooling jacket 138. The exact path of individual molecules is not known but is believed to vary relative to changes in temperature, pressure, cooling unit position, etc. However, generally during operation coolant will be present in locations indicated by arrows denoted "C". The coolant will move into the front cavity 143 and then to the rear cavity 144 and out of the coolant jacket 138 as generally indicated below.

The cooling system prior to initial operation is filled with coolant with unit 35 filled by an opening 157 in the top surface 111 of unit 35. Opening 157 generally is a threaded hole adapted to receive a radiator type cap (not shown). During operation coolant circulated as indicated in the description above through a closed circuit under pressure from a coolant pump. As coolant enters first access means such as inlet pipe 120 it comes into contact with and circulates with coolant located in front cavity 143. Coolant circulates around the exhaust main channel 140 (as described in FIG. 10) and were indicated by arrows "C".

Coolant entering inlet pipes 120 is believed to be directed in a downward fashion by a partition or baffle 145. Advantageously, the baffle 145 is angled to facilitate this downward flow. An angle alpha of between about 90 to 130 degrees between the partition and a horizontal axis as found in top wall 111 is believed to be suitable with an angle of 105 degrees preferred. Baffle 145 connects an inner side wall 113 with top wall 111, outer side wall 58, and main channel wall 141, to divide the interior of the cooling jacket 38 into a front cavity 143 and a rear cavity 144. The partition or baffle opening 146 through which the heat exchanger 136 extends is sealed by sealing means such as a rubber-type O-ring gasket 158. Coolant flows around heat exchanger tube casing 151 and a front cavity portion of the main exhaust channel wall 141 absorbing heat from the channel wall 141 while being cooled from contact with casing 151. Coolant then flows into a plurality of forward openings 159 in the heat exchanger tube casing 151 and flows around a plurality of spaced apart tubes 150 contained therein; the coolant being cooled by transfer of heat (desorption) through the conductive material of the tubes 150 to raw water being pumped therethrough. Under pressure the coolant travels around tubes 150 but within tube casing 151 causing the coolant to desorb heat to the raw water until the coolant escapes the tube casing through a plurality of rear tube casing openings 160 into rear cavity 144.

Both forward and rearward tube casing openings 159 and 160 may be formed in a variety of shapes and sizes. For a typical heat exchanger unit 136 having about 50-55 tubes of about ¼ inch inner diameter held within a tube casing of about 2 inches in diameter and installed within a unit 35 and system 20 as described above, five to six annular openings 159, and a similar set of distal openings 160 formed by drilling through the casing with a one inch drill bit to form an evenly spaced circumferential ring of openings has been found suitable and easy to manufacture. In another embodiment, the openings 159 and 160 may be made through the casing 151 on a side opposing either or both inlet or outlet openings to unit 35 to facilitate coolant mixing and heat transfer. Also, the location of the openings 159 and 160 may vary. In another embodiment, the tube casing 151 has an outer diameter sufficiently small relative to the inner diameter of fluid and/or outlet pipes 117, 132 to allow coolant movement through a portion of the pipes 117 and/or 132 to openings 159 and 160 which are disposed within the pipes 117 and/or 132 as shown in FIG. 8A by slotted openings 159A and 160A with dashed arrows showing flow. This embodiment has the advantage of providing additional cooling through a prolonged contact time with a greater length of heat exchanger tubing. Coolant upon entering the rear cavity 144 of unit 35 has been cooled by contact with the heat exchanger 136 and circulates around the heat exchanger tube casing 151 and also around the rear portion of the main exhaust channel wall 141 where the coolant absorbs heat from exhaust gases passing through main exhaust channel 140. Coolant then passes out a second access means for fluidic communication between the rear cavity 144 and the jacket exterior, such as a flanged coolant outlet pipe 134 having an opening 135. Then the coolant is conveyed by transfer means to a corresponding similar unit 36 as described above.

Each exhaust transfer and cooling manifold unit such as unit 35 will advantageously provide draining means such as threaded drain opening 161. This drain may be fitted with a sacrficial anode plug such as zinc anode plug 162 to protect against galvanic corrosion. Whenever dissimilar metals are in contact through a fluid which acts as an electrolyte a current may be established which promotes destructive electrolysis. Provision of a material in the form of a plug which is sacrificed as an anode directs this electrolysis to an inexpensive, easy to replace, component thereby protecting more valuable components such as a cast exhaust transfer and cooling manifold unit 35.

Referring now to FIG. 8B, an end view of a heat exchanger unit 136 is presented. The heat exchanger 136 has a tube casing 151 containing a plurality of open ended tubes 150 held in spaced apart relation by a tube plate 163. For clarity FIG. 8B depicts only a few tubes 150, however, a typical heat exchanger may have many tubes in close, generally parallel, alignment. It is desirable that the tubes 150 be spaced a sufficient distance apart to allow for coolant contact with a maximum surface area of the tubes to facilitate heat transfer and cooling of the coolant. Preferably, to minimize corrosion, the casing 151, tube plates 163, and tubes 150 will all be made of the same type material. Advantageously, an alloy of copper such as 90% copper with 10% nickel is utilized. While the casing 151 may be formed with integrally cast end plates 163, it is usually more economical to secure separate tube plates 163 at each end of open ended cylindrical casing 151. For example, silver soldering or use of a suitable adhesive such as an epoxy resin may be used to secure a tube plate 163 to a tube casing 151. Also individual tubes 150 may be similarly secured to provide connections which are sealed against leakage.

Referring now to FIG. 9, a sectional view of unit 36 of FIG. 6B is depicted with a heat exchanger 164. Unit 36 has a top wall 122 (with coolant opening 165), connected to a rear wall 80, front wall 124, and bottom wall 123 to form with connected outer wall 86 and corresponding inner wall 110 (see FIG. 5), a cooling jacket 166. The cooling jacket 166 is divided into a rear cavity 167 and a front cavity 168 by a baffle 169. The cooling jacket substantially encloses an exhaust manifold 170 formed by exhaust channel wall 171 which directs entering exhaust gases along a main exhaust channel 172 and out an exhaust port 75 in rear exhaust extension 77. Exhaust gases flow from transfer channels in the direction indicated by arrows denoted "A" through the main exhaust channel 172 and out port 75. The heat exchanger 164 is substantially similar to the heat exchanger described above for use with unit 35.

The heat exchanger 164 has a tube casing 173 with side holes 174 at opposing ends. These holes 174 may be located closed to each end 175 and 176 of the heat exchanger to make more efficient use of the cooling ability of the heat exchanger 164 by providing a longer coolant path adjacent to internally located tubes. It is contemplated that the heat exchanger employed will advantageously be interchangeable between units 35 and 36. Raw water will be pumped into end 176, through a plurality of tubes contained therein and expelled out of end 175 as indicated by arrows designed as "B". The heat exchanger is situated within the coolant jacket 166 of unit 36 and extends through an outlet pipe 127, and opening 175 in baffle 169 and through the inlet pipe 102. An O-ring 176 seals opening 175 from undesirable fluid flow from rear cavity 167 to front cavity 168. Advantageously, the O-ring wil be located on the high pressure side relative to the front and rear cavities of each individual unit 35 or 36. In one beneficial embodiment, baffle 169 may form an angle beta with top wall 122 to facilitate coolant mixing and transfer in rear cavity 167. Angle beta may suitably have the same range as angle alpha and advantageously be about 105 degrees.

The coolant enters the cooling jacket 166 by means of coolant inlet pipe 129 under pressure from unit 35 via transfer means such as a hose (see FIG. 3). The coolant follows a circuitous path absorbing heat from the exhaust manifold and travelling from the rear cavity 167 to the front cavity 168 through a heat exchanger 164 as indicated by arrows designated "C". The coolant temeprature is lowered by passage through the heat exchanger 164 and then raised by absorption of heat from contact with exhaust channel wall 171 and from passing through engine passage ways after leaving flanged coolant outlet pipe 126 having opening 177 (as described above for FIG. 1).

It should be apparent from the description above that the units 35 and 36 are very similar and may advantageously employ similar uniform components such as heat exchangers. Generally, the main differences between units 35 and 36 are the location of coolant inlet and outlet pipes which are generally situated to provide ease of plumbing short and convenient routing of hoses and may be adatped in alternate embodiment by one of ordinary skill in the art to accommodate different engine designs. It will be further recognized that the coolant may be pumped from a coolant pump first to either a right or left manifold unit and routed therethrough and then to the other unit in a closed circuit to provide engine and manifold cooling in accordance with the present invention. Aside from the location of access means the only other significant difference between units 35 and 36 is the location of the partition or baffles 145, 169. It will be appreciated that the partition directs coolant flow in a circuitous route to provide heat transfer via the coolant from hot engine components such as the exhaust manifolds to raw water which is passing through the individual heat exchangers contained within the cooling jacket. This raw water is continually expelled to a surrounding body of water. Each manifold unit has a high pressure side and a low pressure side with a partition generally directing coolant entering each unit downward past a portion of the heat exchanger to a portion of the exhaust manifold thereby facilitating heat absorption and heat transfer. An O-ring may be used on the high pressure side to prevent or reduce leakage of coolant from the high pressure cavity to the low pressure cavity without passing through a heat exchanger. If it is desirable for some reason to lower the cooling efficiency of the system, then holes or bypasses to the partition may be provided.

Figure 10:
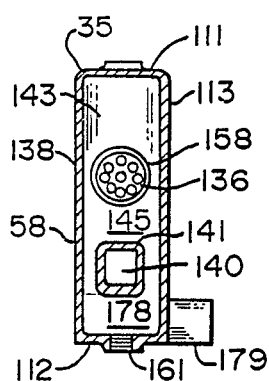
FIG. 10 is a cross-sectional view of a manifold unit of FIG. 1 taken along lines 10—10.

Referring now to FIG. 10, a cross-sectional view is presented of unit 35. A coolant jacket 138 having an interior front cavity 143 is formed by top wall 111, inner wall 113, bottom wall 112, and outer wall 58. A drain opening 161 extends from front cavity 143 through the bottom wall 112. A main exhaust channel 140 is formed by channel wall 141 and extends from the front cavity 143 through a partition 145 into a rear cavity (see FIG. 8A). An exhaust transfer channel wall 178 forms part of a transfer channel (see FIG. 8A) which transfers exhaust gases from a side exhaust extension 179 to main channel 140. Transfer channel wall 141 is integral with partition 145 forming a separate front cavity. The main exhaust channel wall 141 may have a plurality of integral stabilizing members which are generally round "legs" of integrally cast metal connecting an outer wall 58 or inner wall 113 with the main exhaust channel wall 141 for additional security against cracking. Generally coolant will flow around such members which may have a circular corss-section of about 1 inch. Extending through the partition 145 is a heat exchanger 136 with an O-ring 158 acting to minimize any coolant leakage through the opening in the partition for the heat exchanger. It should be apparent that the description of features for unit 35 will be analagous to those for unit 36 and are believed to be apparent from the present description of either unit.

Referring now to FIG. 11, a cross-sectional view of unit 35 is presented. A cooling jacket 138 is formed by connected top wall 111 (having a coolant filler opening 157), inner wall 113, outer wall 58, and bottom wall 112. Partition 145 is integrally connected to the above walls, 111, 113, 58, and 112 to form an interior rear cavity 144 (see FIG. 8A) a heat exchanger 136 extends through an opening 146 in the partition 145. Side exhaust transfer extension 179 has a side extension transfer channel 115 which communicates with a connected main exhaust channel 140 forming a main exhaust channel wall 141.

Figure 12:
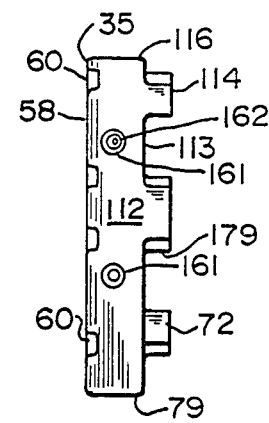
FIG. 12 is a bottom view of the right manifold unit depicted in FIG. 6B.

Referring now to FIG. 12, a bottom view is presented of an exhaust transfer and cooling manifold unit 35. An outer wall 58 having a plurality of sunken depressions 60 is connected to rear wall 79, front wall 116, and to an inner wall 113 by bottom wall 112. A drain opening 161 is provided for each internal cavity and is beneficially equipped with a sacrificial anode plug 162. A plurality of side exhaust extensions 72, 114, and 179 act to space the cooling jacket away from the connected engine and to transfer exhaust gases to a main exhaust channel located within unit 35.

In view of the above description and drawings, different embodiments, modifications and changes will be apparent to those skilled in the art and all such modification, embodiments, and changes are deemed to be within the scope of the invention as defined by the following claims.

What is claimed is:

1. An exhaust transfer and cooling apparatus comprising: an exhaust manifold with connected cooling jacket; and means for connecting said apparatus to an engine block; said exhaust manifold having a channel wall forming a main exhaust channel connecting a plurality of engine exhaust transfer channels to a manifold exhaust gas port; and said cooling jacket having (a) integrally connected top, bottom, front, rear and side walls forming an interior space which is divided into a front cavity and rear cavity by a partition, said partition having an opening for communicating heat exchange means between said front cavity and said rear cavity, (b) a first access means for fluidic communication between said front cavity and said jacket exterior, (c) a second access means for fluidic communication between said rear cavity and said jacket exterior, (d) means for receiving a heat exchanger apparatus within said jacket and (e) duct means for fluidic communication between said jacket enclosed heat exchanger and said jacket exterior.

2. An apparatus, as defined in claim 1, wherein said partition is integrally connected to said top and opposing side walls of said cooling jacket and said channel wall of said exhaust manifold.

3. An apparatus, as defined in claim 1, wherein said partition depends downward from said top wall forming an angle of about 90 to about 130 degrees.

4. An apparatus, is defined in claim 3, wherein said angle is about 105 degrees.

5. An apparatus, as defined in claim 1, wherein said partition has a plurality of holes between said front and rear cavities for fluidic communication which bypasses said heat exchange means.

6. An apparatus, as defined in claim 1, wherein said first access means comprises an integrally molded flanged pipe.

7. An apparatus, as defined in claim 1, wherein said second access means comprises an intergrally molded flanged pipe.

8. An apparatus, as defined in claim 6, wherein said second access means comprises an integrally molded flanged pipe.

9. An apparatus, as defined in claim 8, wherein said means for receiving a heat exchanger apparatus comprise said pipes and said partition opening.

10. An apparatus, as defined in claim 1, wherein said means for receiving a heat exchanger comprises an opening in said front wall, an opening in said rear wall, and said partition opening.

11. An apparatus, as defined in claim 1, further comprising a removable sacrifical anode plug.

12. An apparatus, as defined in claim 1, wherein said cooling jacket has a drain opening proximate said bottom wall.

13. An apparatus, as defined in claim 1, wherein said duct means comprises at least one opening in a cooling jacket wall.

14. An apparatus, as defined in claim 1, wherein said duct means comprises an opening in a cooling jacket wall proximate said front wall and an opening in said cooling jacket wall proximate said rear wall.

15. An apparatus, as defined in claim 1, wherein said front cavity surrounds a portion of said main exhaust channel.

16. A process for cooling a V-type internal combustion marine engine comprising: circulating by pumping means coolant through at least one passageway in an engine block, absorbing heat therefrom, conveying said coolant by first transfer means into a first cooling jacket for a first exhaust manifold and absorbing heat from said manifold, said first cooling jacket containing a first heat exchanger apparatus through which raw water is pumped, said raw water having a lower temperature than said coolant with said raw water being segregated from said circulating coolant by a physical barrier of said first heat exchanger apparatus which promotes heat transfer between said coolant and said raw water yet prevent any commingling of coolant and raw water, desorbing heat from said coolant to said raw water, passing by second transfer means cooled coolant out of said first cooling jacket and into a second cooling jacket for a second exhaust manifold, said second cooling jacket containing a second heat exchanger apparatus through which raw water is pumped, said raw water having a lower temperature than said coolant with said raw water being segregated from said circulating coolant by a physical barrier of said second heat exchanger apparatus which promotes heat transfer through said barrier between said coolant and said raw water yet prevents any commingling of coolant and raw water, absorbing heat from said second exhaust manifold and desorbing heat to said raw water, then transferring by third transfer means cooled coolant out of said second cooling jacket and into said engine block passageway thereby completing circulation of coolant within a closed circuit.

* * * * *